Nov. 7, 1939.  M. SACHEROFF  2,179,275
COLLAPSIBLE BABY WALKER AND CARRIAGE
Filed May 13, 1938  2 Sheets-Sheet 1
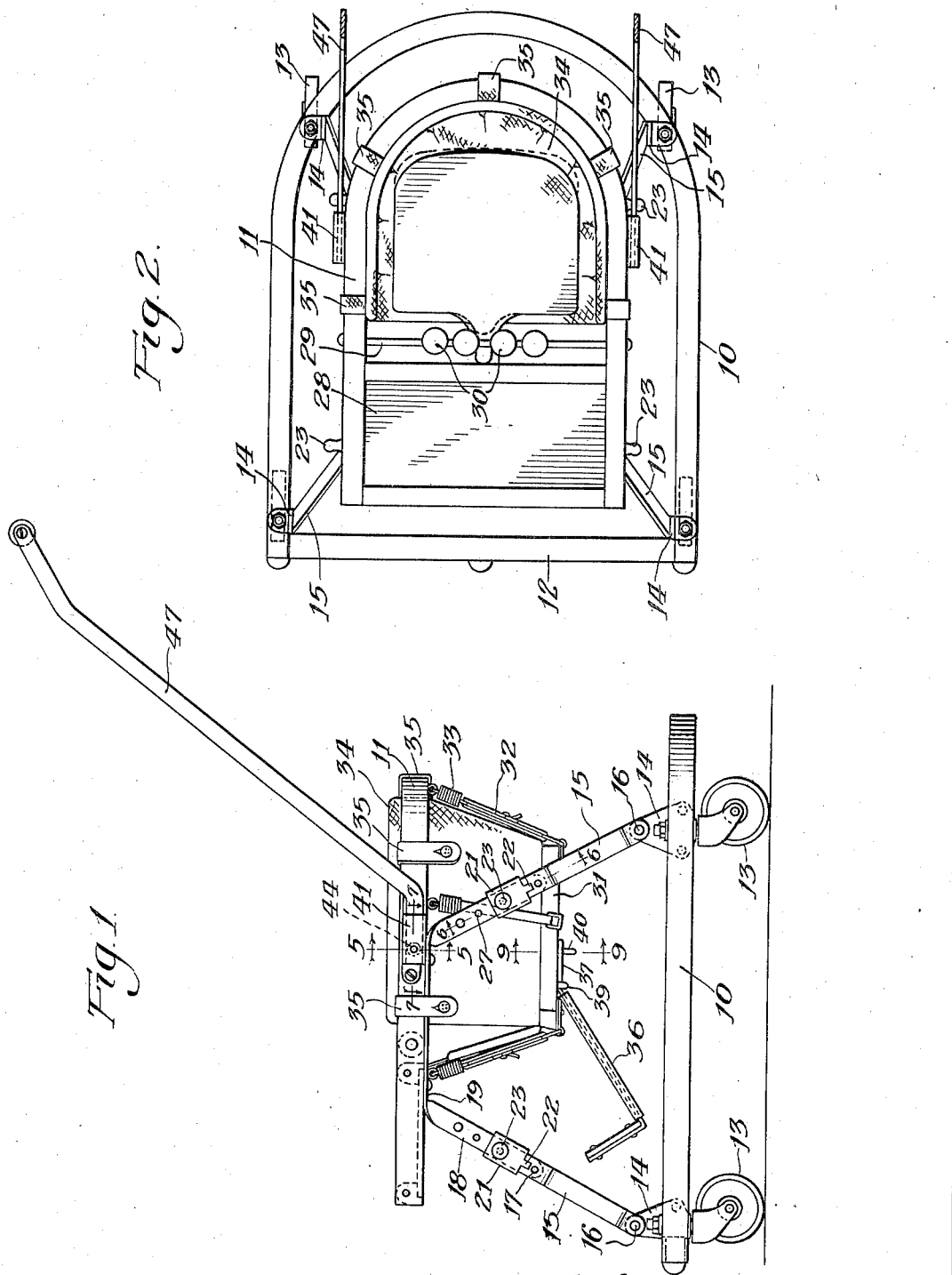
Inventor:
Maurice Sacheroff,
By: Benjamin Schneider
Attorney.

Nov. 7, 1939.                M. SACHEROFF                2,179,275
                  COLLAPSIBLE BABY WALKER AND CARRIAGE
                          Filed May 13, 1938              2 Sheets-Sheet 2
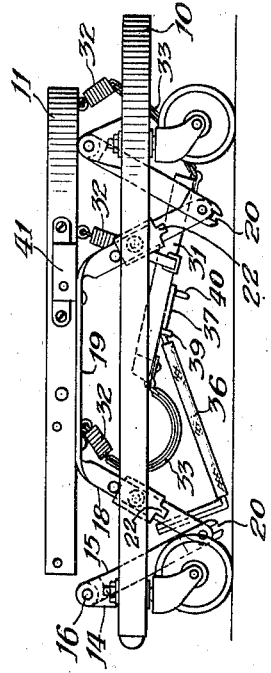
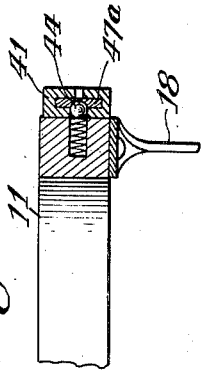
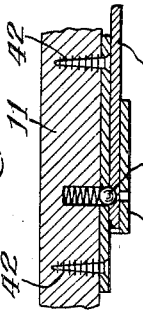
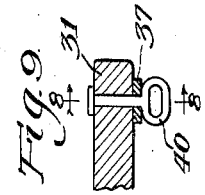
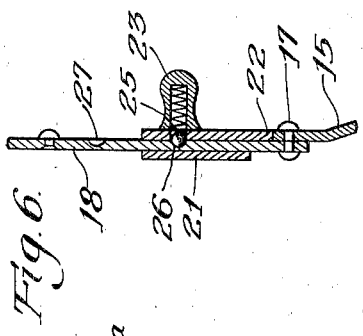
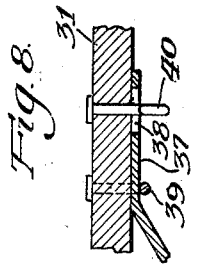
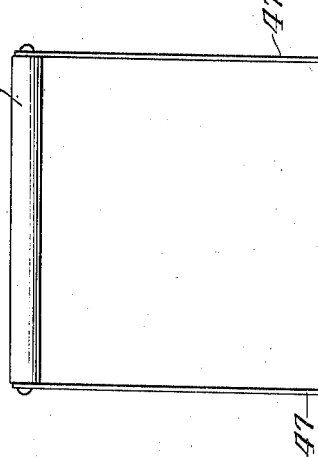
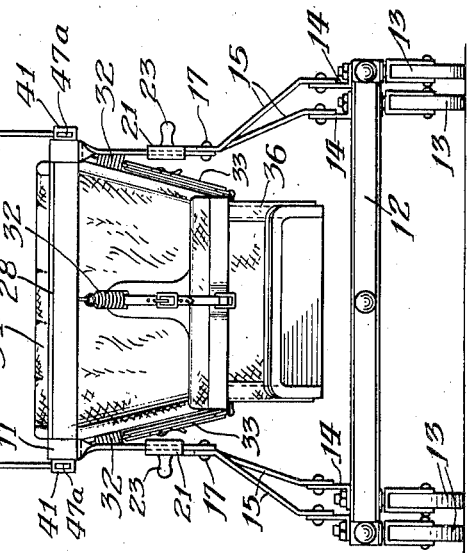
Inventor:
Maurice Sacheroff,
By: Benjamin Schneider
            Attorney.

Patented Nov. 7, 1939

2,179,275

UNITED STATES PATENT OFFICE 2,179,275

COLLAPSIBLE BABY WALKER AND CARRIAGE

Maurice Sacheroff, Cleveland Heights, Ohio

Application May 13, 1938, Serial No. 207,718

7 Claims. (Cl. 280—36)

This invention relates to baby walkers or strollers and more particularly to a baby walker capable of being collapsed for transportation or storage. The collapsible baby walker of my invention may be readily converted into a carriage or auto by the aid of which the baby may be pushed or pulled about as desired. It is a feature of my invention to provide a collapsible baby walker adapted to be readily converted into a baby chair for use in an automobile or train.

It it an object of my invention to provide a baby walker having an upper and lower frame connected by a plurality of knock-down linkage systems which in knock-down position permit the upper frame as well as the linkage systems to telescope or nest in the lower frame to provide a compact, pancake form of package capable of being conveniently stored in a limited area or readily carried.

It is a further object of my invention to provide a novel locking mechanism for the elements comprising each linkage system to enable them to be locked in an extended position with the elements occupying a projected straight line position so that the frames of the walker may be rigidly supported one above the other to provide a rigid support for a seat.

It is a further object of my invention to provide a collapsible baby walker or stroller to which a detachable foot rest and detachable handle may be readily secured whereby the walker or stroller may be converted into a carriage or baby auto.

It is a further object of my invention to provide a collapsible baby walker which is simple in design and of sturdy construction, relatively light in weight and relatively inexpensive to manufacture.

The invention possesses many other advantages which may be made more easily apparent from a consideration of the embodiment shown in the drawings. This embodiment will be described in detail to illustrate the invention; but it is to be understood that the invention is not limited to the details shown and described except as set forth in the appended claims.

The invention is illustrated in the accompanying drawings wherein:

Figure 1 is a side elevation of a collapsible baby walker embodying my invention with the foot rest and handle attached thereto, thereby converting it into a carriage;

Fig. 2 is a top plan view thereof;

Fig. 3 is a front elevation thereof;

Fig. 4 is a side elevation of the baby walker shown in Fig. 3 in collapsed position with the handle removed;

Fig. 5 is a detail sectional view showing the arrangement for locking the removable handle bars to the top frame taken along the line 5—5 of Fig. 1;

Fig. 6 is a detail sectional view showing the means for locking the knock-down linkage systems in extended position taken along the line 6—6 of Fig. 1;

Fig. 7 is a view similar to Fig. 5 taken along the line 7—7 of Fig. 1;

Fig. 8 is a detail sectional view showing the arrangement for detachably securing the foot-rest to the seat taken along the line 8—8 of Fig. 9; and Fig. 9 is a similar view taken along the line 9—9 of Fig. 1.

In the drawings, referring particularly to Figs. 1–3, there is shown a baby walker made in accordance with the present invention, comprising a bottom frame 10 and a smaller body frame 11 connected by knock-down linkage systems extending between the overlying sides of the frames. As shown in these figures, each of the sides of the frame is connected by a pair of linkage systems in extended position for rigidly supporting the top frame above the bottom frame.

Bottom frame 10 is formed of a U-shaped portion made from bent wood or bent metal or a combination of the two, and a front end member 12 closing the mouth of the U to provide within it a free open space through which the feet of a a baby may extend. The bottom frame is mounted on wheels or casters 13 which, as shown, are secured to the underside of the frame at suitable points; for example, at four points, as illustrated. Obviously, a three-point support may be provided if desired. On the upper side of the frame I provide four brackets 14 which are rigidly bolted to the frame and formed with upstanding ears or lugs to which the ends of the knock-down linkage systems are pivotally secured.

Each knock-down linkage system comprises a link 15 pivotally secured at one end to the bracket 14 as by a pin 16. The other end of the link is formed with an open slot, as at 20 (Fig. 4), and is pivotally secured, as by a pin 17, to one end of a downwardly extending arm 18. The free end of arm 18 is rigidly secured to the underside of body frame 11. As clearly shown in Figs. 1 and 4 the downwardly extending arms 18 on each side of the frame are integral with a member 19 secured to the underside of the frame. As clearly shown in Fig. 3 each link 15 is of a generally Z-shape to provide an off-set, thereby enabling the upper portion of the link to be aligned with the downwardly extending arm 18 above pin 17. It is apparent from Fig. 1 that link 15 and arm 18 in the extended position shown are in a projected straight line position.

On each arm 18 I provide a slidable sleeve 21 having a tongue or extension 22 adapted to enter slot 20 in link 15 to lock the link and arm in aligned position. A knob or button 23 is provided on sleeve 21 to move the latter to push the tongue 22 into or pull it out of slot 20 to lock or unlock the link. A spring pressed plunger or ball 25 is provided on the back of face portion of sleeve 21, which is adapted to seat in a recess 26 provided in arm 18. In this position, the linkage system is maintained in the extended form shown in Figs. 1–3. Arm 18 is provided with an additional recess 27 which is more remote from pin 17 than recess 26 for locking sleeve 21 to arm 18 in the contracted or telescoped position shown in Fig. 4.

Body frame 11 is formed in the same manner as bottom frame 10, although in size it is somewhat smaller, as clearly shown in Figs. 1–4. It may, if desired, be made of the same size as the bottom frame or even larger, but I prefer the smaller size since I am thereby enabled to contract the walker into a compact package with the smaller frame and all connecting parts telescoped or nested within the area defined by the bottom frame as shown in Fig. 4. At the forward end of frame 11 there may be provided a play or feeding tray 28 and adjacent thereto a rod 29 on which play beads 30 are threaded.

From the rear portion of body frame 11 I suspend a seat 31, as by the adjustable straps 33 detachably secured to the underside of the frame by means of the springs 32. I thereby provide a detachable and adjustable spring-suspended seat in which the baby may be seated. As a back and side support for the baby I may provide an upholstered seat cushion 34 which is detachably secured to the frame, as by the straps 35 each having one end secured to the cushion and the other looped over the frame and buttoned to the back of the cushion as shown in Fig. 1.

The device hereinabove described constitutes a baby walker by means of which a baby may propel itself about in a known manner. This device may be readily transformed into a carriage or auto by means of which the baby may be pushed or pulled about. Thus I provide a foot-rest 36 of a substantially L-shape having a pair of rearwardly extending flat bars 37 by means of which the foot-rest may be detachably secured to the bottom of seat 31. Bars 37 are each provided with an elongated slot 38 adjacent the free end thereof. Secured to the underside of seat 31 adjacent the forward extremity thereof are a pair of eye bolts 39 through which bars 37 are threaded in securing the foot-rest to the seat. Rearwardly of the eye bolts are a pair of keys 40 rotatably mounted in the seat. In locking the bars to the seat, they are passed through the eye bolts 39, tipped slightly to pass over the keys 40, brought into position against the bottom of the seat, and the keys 40 then turned to lock the foot rest in position as shown in Figs. 8 and 9.

For the attachment of a handle, I provide on each side of body frame 11 near its back elongated sleeves or guides 41, secured to the frame, as by the screws 42 as shown in Fig. 7. The handle carrying bars 47 are provided with suitably bent, flat free ends 47a which enter the guides 41, and are locked in position by any suitable means, as by the spring pressed plungers or balls 44 mounted in suitable bores in the frame 11 and guides 41 and cooperating recesses in handle bar ends 47a. A handle 49 extends between the handle bars 47.

To collapse the baby walker into a compact package as shown in Fig. 4, the handle bars are removed from guides 41 and sleeves 21 are pushed up on arms 18 to remove tongues 22 from slots 20 and unlock the linkage systems. The top frame is then telescoped into the bottom frame and in this position the links 15 and arms 18 of each linkage system occupy a projected broken line position wholly within the area of frame 10. In this position the baby walker may be readily stored or transported.

The baby walker described above may be readily converted into a seat adapted for use in an automobile or train. To accomplish this, the front pair of linkage systems are extended as shown in Figs. 1 and 3 and the rear pair are collapsed as shown in Fig. 4. The device in this position is rigid and may be secured to the seat of an automobile or train in any desirable manner with the rear portion of the device resting against the back of the seat. If the bottom frame is inclined at a proper angle with respect to the back of the seat, seat 31 of the device will be positioned in a horizontal plane.

I claim:

1. A collapsible baby walker comprising an open bottom frame, a top or body frame having a seat supported therefrom and a plurality of linkage systems connecting the frames, each of said linkage systems comprising a plurality of elongated members pivotally joined in end to end relationship, one of said members having its free end rigidly secured to one of said frames, said members being adapted to have an extended position to support the top frame above the bottom frame and a contracted position to permit the top frame to telescope into the bottom frame to provide a compact package.

2. A collapsible baby walker comprising an open bottom frame, a top or body frame having a seat supported therefrom and a plurality of knock-down linkage systems connecting the frames, each of said systems comprising an arm and a link pivotally joined in end to end relation, the free end of said arm being rigidly secured to one of said frames and the free end of the link being pivotally secured to the other frame, said arm and link being adapted to have an extended position with the arm and link occupying a projected straight line position to support the frames one above the other and a contracted position with the arm and link occupying a projected broken line position whereby the top frame is telescoped into the bottom frame to provide a compact package.

3. A collapsible baby walker comprising an open bottom frame, a top or body frame having a seat supported therefrom and a pair of knock-down linkage systems on each side of the walker connecting the frames, each of said systems comprising an arm and a link pivotally joined in end to end relation, the free end of said arm being rigidly secured to one of said frames and the free end of the link being pivotally secured to the other frame, said arm and link being adapted to have an extended position with the arm and link occupying a projected straight line position to support the frames one above the other and a contracted position with the arm and link occupying a projected broken line position whereby the top frame is telescoped into the bottom frame to provide a compact package.

4. The baby walker set forth in claim 3 wherein the link has a slotted extension beyond the joint with the arm and the arm has, slidably supported thereon, a sleeve carrying a tongue adapted to be inserted in the slot whereby the arm and link may be rigidly locked together to maintain them in extended position.

5. The baby walker set forth in claim 3 wherein the link has a slotted extension beyond the joint with the arm and the arm has, slidably supported thereon, a sleeve carrying a tongue adapted to be inserted in the slot whereby the arm and link may be rigidly locked together to maintain them in extended position and wherein the pair of linkage systems on each side of the baby walker converge as they approach the top frame when the arms and links are in said extended position.

6. A combination baby walker and carriage comprising an open bottom frame and a top or body frame having a handle removably secured thereto, a seat suspended from said top frame, said seat having a foot-rest removably secured thereto, and a pair of knock-down linkage systems on each side of the walker connecting the frames, each of said systems comprising an arm and a link joined in end to end relation, the free end of said arm being rigidly secured to one of said frames and the free end of the link being pivotally secured to the other frame, said arm and link being adapted to have an extended position with the arm and link occupying a projected straight line position to support the frames one above the other and a contracted position with the arm and link occupying a broken line position whereby the top frame is telescoped into the bottom frame to provide a compact package.

7. The combination baby walker and carriage set forth in claim 6 wherein the link has a slotted extension beyond the joint with the arm and the arm has, slidably supported thereon, a sleeve carrying a tongue adapted to be inserted in the slot whereby the arm and link may be rigidly locked together to maintain them in extended position.

MAURICE SACHEROFF.